United States Patent
Sasaki et al.

(10) Patent No.: US 10,691,978 B2
(45) Date of Patent: Jun. 23, 2020

(54) OPTIMAL AND EFFICIENT MACHINE LEARNING METHOD FOR DEEP SEMANTIC SEGMENTATION

(71) Applicant: DRVision Technologies LLC, Bellevue, WA (US)

(72) Inventors: Hideki Sasaki, Bellevue, WA (US); Chi-Chou Huang, Redmond, WA (US); Shih-Jong James Lee, Bellevue, WA (US)

(73) Assignee: DRVISION TECHNOLOGIES LLC, Bellevue, WA (US)

( * ) Notice: Subject to any disclaimer, the term of this patent is extended or adjusted under 35 U.S.C. 154(b) by 227 days.

(21) Appl. No.: 16/010,593

(22) Filed: Jun. 18, 2018

(65) Prior Publication Data

US 2019/0385021 A1 Dec. 19, 2019

(51) Int. Cl.
| | |
|---|---|
| *G06K 9/62* | (2006.01) |
| *G06K 9/72* | (2006.01) |
| *G06N 3/08* | (2006.01) |

(52) U.S. Cl.
CPC ........... *G06K 9/6262* (2013.01); *G06K 9/726* (2013.01); *G06N 3/084* (2013.01); *G06T 2207/20081* (2013.01); *G06T 2207/20084* (2013.01)

(58) Field of Classification Search
CPC ...... G06K 9/6262; G06K 9/726; G06N 3/084; G06T 2207/20084
See application file for complete search history.

(56) References Cited

U.S. PATENT DOCUMENTS

| | | | |
|---|---|---|---|
| 2019/0205606 A1* | 7/2019 | Zhou | G06N 3/0445 |
| 2019/0295227 A1* | 9/2019 | Wang | G06K 9/4628 |
| 2019/0333198 A1* | 10/2019 | Wang | G06T 5/002 |

OTHER PUBLICATIONS

Ronneberger et al., "U-Net: Convolutional Networks for Biomedical Image Segmentation", arXiv:1505.04597v1 [cs.CV], May 18, 2015.
He et al., "Identity Mappings in Deep Residual Networks", arXiv:1603.05027v3 [cs.CV] Jul. 25, 2016.

(Continued)

*Primary Examiner* — Kenny A Cese
(74) *Attorney, Agent, or Firm* — Pai Patent & Trademark Law Firm; Chao-Chang David Pai

(57) ABSTRACT

Four computerized machine learning methods for deep semantic segmentation are fast machine learning method, active machine learning method, optimal machine learning method, and optimal transfer learning method. The fast machine learning method performs a fast deep semantic segmentation learning on training images to generate a deep model. The active machine learning method performs a fast deep semantic segmentation learning on initial training images to generate a first deep model and then an active deep semantic segmentation learning to generate a second deep model. The optimal machine learning method performs a fast deep semantic segmentation learning on initial training images to generate a first deep model and then an optimal deep semantic segmentation learning to generate a second deep model. The optimal transfer learning method applies a pre-trained first deep model on transfer training images and then an optimal deep semantic segmentation transfer learning to generate a second deep model.

8 Claims, 3 Drawing Sheets

(56) References Cited

OTHER PUBLICATIONS

Garcia-Garcia, "A Review on Deep Learning Techniques Applied to Semantic Segmentation", arXiv:1704.06857v1 [cs.CV] 22 Apr. 22, 2017.
Huang et al., "Densely Connected Convolutional Networks", arXiv:1608.06993v5 [cs.CV] Jan. 28, 2018.

\* cited by examiner

OPTIMAL AND EFFICIENT MACHINE LEARNING METHOD FOR DEEP SEMANTIC SEGMENTATION

STATEMENT AS TO RIGHTS TO INVENTIONS MADE UNDER FEDERALLY SPONSORED RESEARCH AND DEVELOPMENT

This work was supported by U.S. Government grant number 4R44NS097094-02, awarded by the NATIONAL INSTITUTE OF NEUROLOGICAL DISORDERS AND STROKE. The U.S. Government may have certain rights in the invention.

BACKGROUND OF THE INVENTION

Field of the Invention

The present invention relates to fast and optimal machine learning and more particularly to a fast and optimal machine learning method for deep semantic segmentation.

Description of the Related Art a. Description of Problem that Motivated Invention.

Machine learning, especially deep learning, powered by the tremendous computational advancement (GPUs) and the availability of big data has gained significant attention and is being applied to many new fields and applications. It can support end-to-end learning and learn hierarchical feature representation automatically. It is highly scalable and can achieve better prediction accuracy with more data. To handle large variations and dynamics inherent in sequential data, high capacity model is often required. It could be extremely effective when trained with high capacity model ($>10^8$ parameters).

However, high capacity model requires the training of huge labeled (annotated) datasets to avoid over-fitting. For example, the image database ImageNet contains 1.2 million images with 1000 categories for deep network training. In this highly connected mobile and cloud computing era big datasets are becoming readily available. Therefore, the bottleneck is in acquiring the labels rather than the data. The situation is exacerbated with semantic segmentation applications as all pixels in the ground truth image are assigned with the categories of their classes, such as vehicles, buildings, streets, pedestrians, trees, signs, signals, and sky etc. Visual/manual annotation is tedious, cumbersome and expensive, and usually needs to be created by domain experts.

b. How Did Prior Art Solve Problem?

FIG. 1 shows the processing flow of a prior art machine learning process to create a deep model for semantic segmentation applications. The inputs to the deep semantic segmentation learning 104 are training images 100 and the corresponding ground truth data 102. The output is a trained deep model 106 that is created by iteratively learning using training images 100 along with corresponding ground truth data 102. To sufficiently train the deep model, it will require a large number of training images 100 and high quality corresponding ground truth data 102 annotated with precise segmentation masks.

In the prior art deep model learning for semantic segmentation, as shown in FIG. 1, truth data for all points of the training images are required wherein truth data assign each point with a class label. The bottleneck of prior art learning architectures for deep semantic segmentation is the requirement of a large number of annotated ground truth of class labels at per-point level. This is labor intensive and could become infeasible for large datasets with a multitude of classes, especially for 3D or video data. Therefore, it is desirable to improve the efficiency of the learning of deep models in semantic segmentation by reducing the amount of required ground truth data.

BRIEF SUMMARY OF THE INVENTION

The primary objective of this invention is to provide an efficient method for computerized fast deep semantic segmentation using partial ground truth. The secondary objective of the invention is to provide a computerized active learning method for deep semantic segmentation. The third objective of the invention is to provide a computerized optimal learning method that weights learning by confidence. The fourth objective of this invention is to provide a computerized optimal transfer learning method for deep semantic segmentation.

In the present invention, deep model is learned with partially annotated ground truth data in which only some regions (not entire image) contain class labels. The regions without labels in the ground truth data are treated as "do-not-care". The fast deep semantic segmentation learning minimizes a do-not-care robust loss function at output layer while iteratively adjusting parameters at each layer of the deep model.

DETAILED DESCRIPTION OF THE PREFERRED EMBODIMENTS

The concepts and the preferred embodiments of the present invention will be described in detail below in conjunction with the accompanying drawings.

I. Fast Machine Learning Method for Deep Semantic Segmentation

Figure 1:
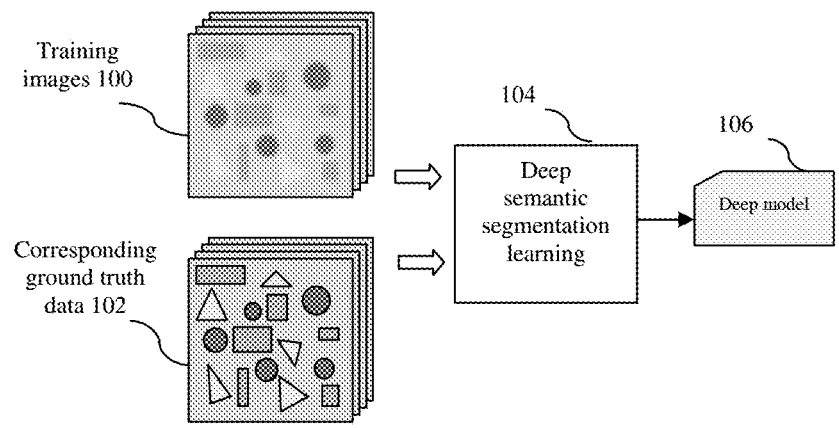
FIG. 1 shows the processing flow of a prior art learning process for deep semantic segmentation.
Figure 2:
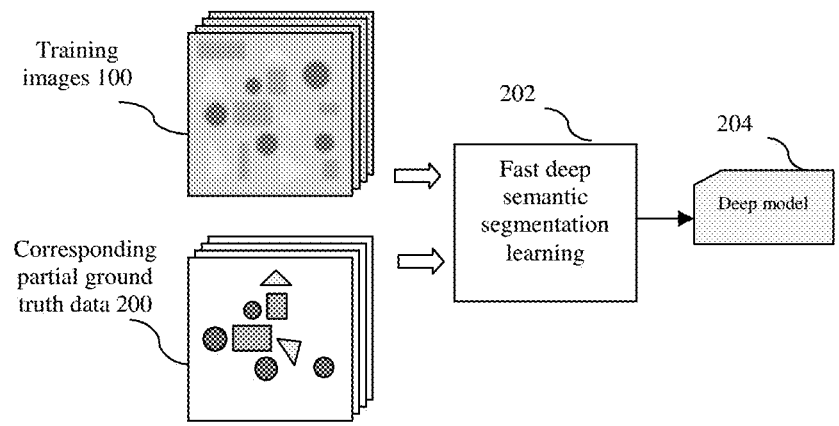
FIG. 2 shows the processing flow of one embodiment of the computerized fast machine learning method for deep semantic segmentation.

FIG. 2 shows the processing flow of one embodiment of the computerized fast machine learning method for deep semantic segmentation. The inputs to the fast deep semantic segmentation learning 202 are training images 100 and the corresponding partial ground truth data 200. The output is a trained deep model 204 that is created by iteratively learning using training images 100 along with corresponding partial ground truth data 200. In this embodiment, deep model 204 is learned with corresponding partially annotated ground truth data 200 in which only some regions (not entire image)

contain truth labels. The regions without labels in the ground truth data are considered "do-not-care" (the white regions in the illustration of the corresponding partial ground truth data 200). Therefore, the partial ground truth data contains do-not-care regions that do not have explicit truth labeling. Therefore, this greatly reduces the requirement of truth data preparation as only partial regions are annotated.

In one embodiment of the invention, the deep model is an encoder-decoder network. The encoder takes an input image and generates a high-dimensional feature vector with aggregated features at multiple levels. The decoder decodes features aggregated by encoder at multiple levels and generates a semantic segmentation mask. Typical encoder-decoder networks include U-Net and its variations such as U-Net+Residual blocks, U-Net+Dense blocks, 3D-UNet. The model can be extended to recurrent neural networks for applications such as language translation, speech recognition, etc.

In one embodiment of the invention, the fast machine learning method for deep semantic segmentation is through an iterative process that gradually minimizes the loss function at output layer by adjusting weights/parameters ($\Theta^*$) at each layer of the model using a back propagation method. The loss function is usually the sum of the differences between ground truth data $L(x)$ and the model output $p(I(x), \Theta)$ for all points of the image $I(x)$. The fast machine learning method of the invention calculates the loss function at output layer by summing up the differences between ground truth and the model output only for points with labels, and ignoring any points within the "do-not-care" regions in the partial ground truth data $L(x)$. A do-not-care robust loss function can be described by the formula below:

$$\Theta^* = \mathrm{argmin}_{\Theta} \int_{label \neq do\text{-}not\text{-}care} \mathrm{Loss}(p(I(x),\Theta), L(x)) dx$$

The back propagation method is then applied to adjust weights/parameters ($\Theta^*$) at each layer of the model once the loss function is calculated and minimized at the last layer.

II. Active Machine Learning Method for Deep Semantic Segmentation

The output of applying a trained deep model to an input image is a probability map that represents the per-pixel prediction by the deep learning model. It is also possible to generate a confidence map as the second output that represents the confidence on the per-pixel prediction by the deep model.

Figure 3A:
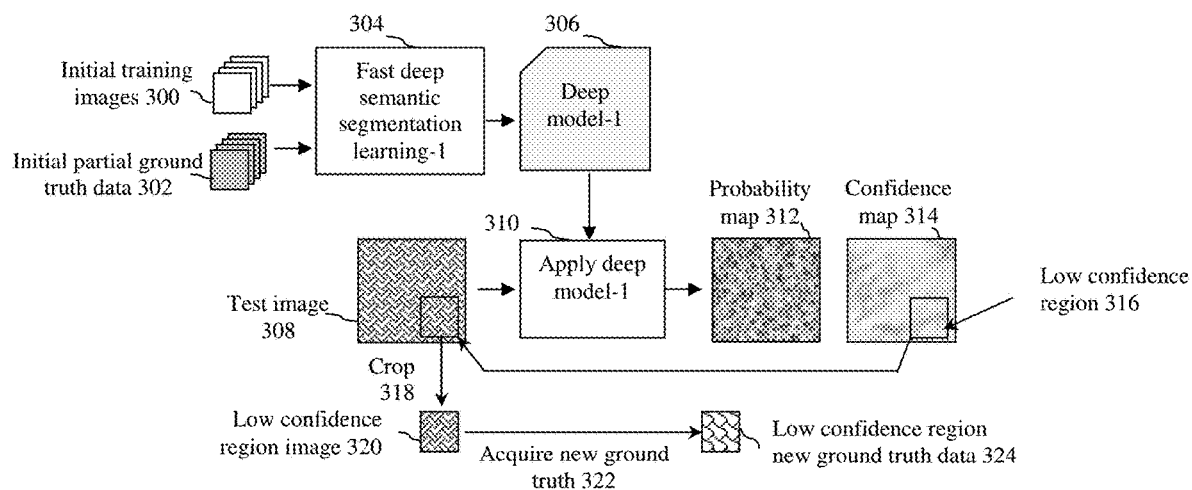
FIG. 3A shows the processing flow of one embodiment of the computerized active machine learning method for deep semantic segmentation applying low confidence region identification and new ground truth acquisition.
Figure 3B:
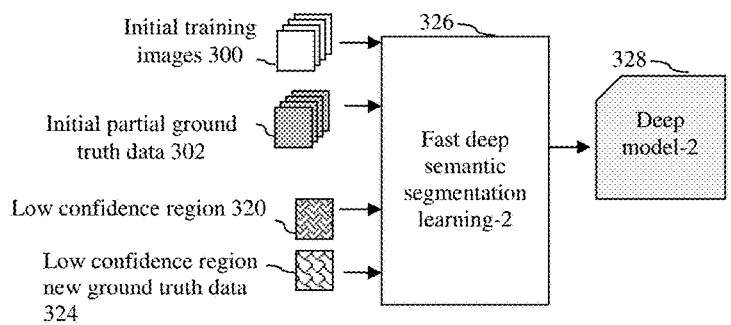
FIG. 3B shows the processing flow of the embodiment of Fast deep semantic segmentation learning-2.

FIG. 3A and FIG. 3B show the processing flow of an active machine learning method for deep semantic segmentation. As shown in FIG. 3A, the method first performs a fast deep semantic segmentation learning-1 304 to generate deep model-1 306 using initial training images 300 and initial partial ground truth data 302. It then applies the deep model-1 310 to an input test image 308 to generate a probability map 312 and a confidence map 314 for the test image 308. The next step of the method is to identify at least one low confidence region 316 from the confidence map 314 and crop 318 from the test image 308 of the corresponding region to create at least one low confidence region image 320, and then acquire the new ground truth 322 for the cropped low confidence region image 320 from additional truth labeling to yield the low confidence region new ground truth data 324.

In FIG. 3B, the fast deep semantic segmentation learning-2 326 generates deep model-2 328 using initial training images 300 and corresponding initial partial ground truth data 302, and low confidence region image 320 as well as the low confidence region new ground truth data 324. The fast deep semantic segmentation learning-2 326 may be a transfer learning that uses parameters from deep model-1 306 to start the learning, or it may be a learning process starting from scratch. The deep model-2 328 can then be applied to images to generate better result, especially for those that contain low confidence regions.

III. Optimal Machine Learning Method for Deep Semantic Segmentation

Figure 4:
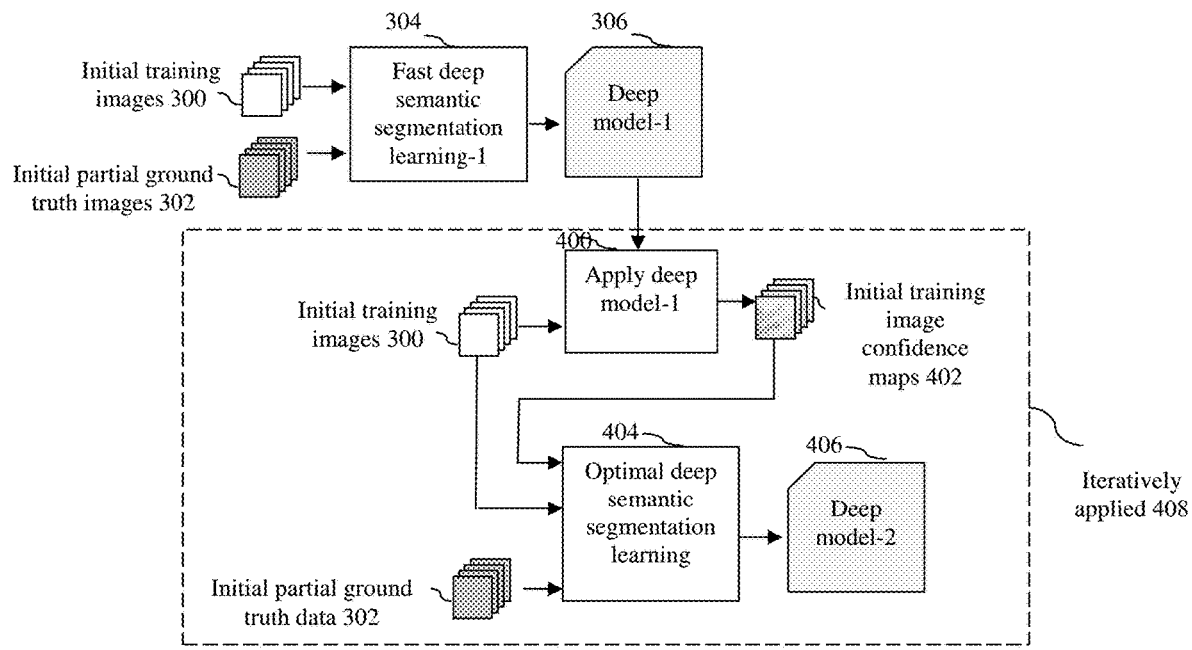
FIG. 4 shows the processing flow of one embodiment of the computerized optimal machine learning method for deep semantic segmentation.

FIG. 4 shows the processing flow of an optimal machine learning method for deep semantic segmentation. As shown in FIG. 4, the method first performs a fast deep semantic segmentation learning-1 304 to generate deep model-1 306 using initial training images 300 and initial partial ground truth data 302. It then applies deep model-1 400 to the initial training images 300 to generate initial training image confidence maps 402. The initial training images 300, the corresponding initial partial ground truth data 302 and the initial training image confidence maps 402 are used for optimal deep semantic segmentation learning 404. The process is iteratively applied 408 until the learning process is completed and the deep model-2 406 is generated. The optimal deep semantic segmentation learning 404 weights learning loss function by the values of the initial training image confidence maps 402.

IV. Optimal Transfer Learning Method for Deep Semantic Segmentation

Figure 5:
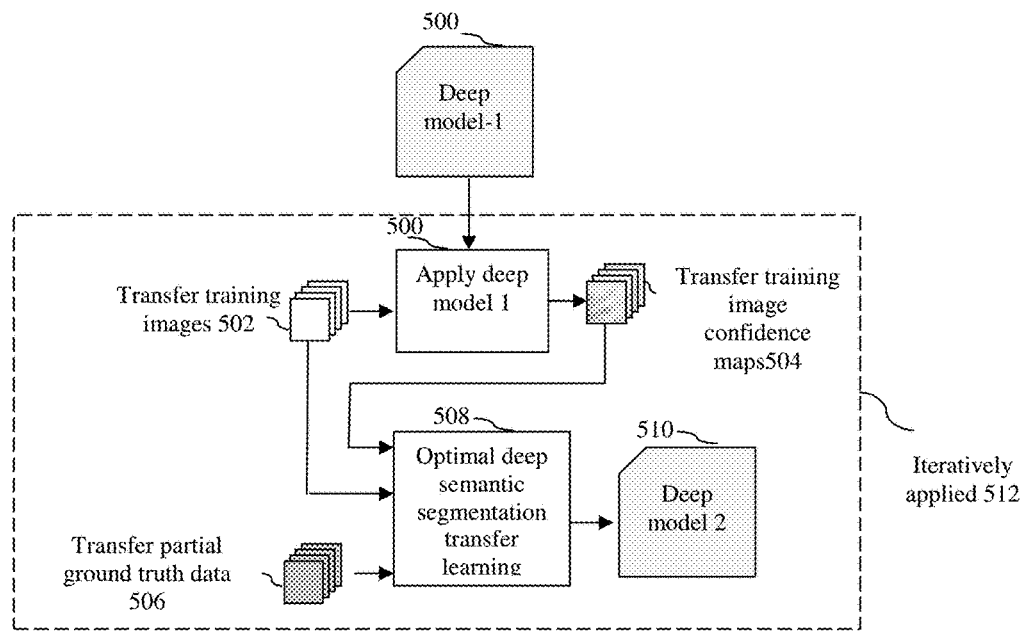
FIG. 5 shows the processing flow of one embodiment of the computerized optimal transfer learning method for deep semantic segmentation.

FIG. 5 shows the processing flow of an optimal transfer learning method for deep semantic segmentation. The method inputs a pre-trained semantic segmentation deep model-1 500 and applies the model to the transfer training images 502 to generate transfer training image confidence maps 504. The transfer training images 502, the corresponding transfer partial ground truth data 506 and the transfer training image confidence maps 504 are used for optimal deep semantic segmentation transfer learning 508. The process is iteratively applied 512 until the learning process is completed and the deep model-2 510 is generated. The optimal deep semantic segmentation transfer learning 508 weights learning loss function by the values of the transfer training image confidence maps 504.

The invention has been described herein in considerable detail in order to comply with the Patent Statutes and to provide those skilled in the art with the information needed to apply the novel principles and to construct and use such specialized components as are required. The embodiments described herein are exemplary and may simplify or omit elements or steps well-known to those skilled in the art to prevent obscuring the present invention. However, it is to be understood that the inventions can be carried out by specifically different equipment and devices, and that various modifications, both as to the equipment details and operating procedures, can be accomplished without departing from the scope of the invention itself.

What is claimed is:

1. A computerized active machine learning method for deep semantic segmentation, comprising the steps of:
   a) inputting a plurality of initial training images and corresponding initial partial ground truth data into electronic storage means;
   b) performing a fast deep semantic segmentation learning-1 by electronic computing means using the plurality of initial training images and the corresponding initial partial ground truth data to generate a deep model-1;
   c) inputting at least one test image into electronic storage means;
   d) performing an active deep semantic segmentation learning by electronic computing means using the plurality of initial training images, the corresponding initial partial ground truth data and the test image to generate a deep model-2;

wherein the active deep semantic segmentation learning comprises the steps of:
  applying the deep model-1 to the test image to generate a confidence map;
  identifying and cropping at least one low confidence region image from the test image;
  acquiring low confidence region new ground truth data from additional truth labeling; and
  performing a fast deep semantic segmentation learning-2 by electronic computing means additionally using the low confidence region image and the low confidence region new ground truth data to generate the deep model-2.

2. The computerized active machine learning method of claim 1, wherein the plurality of initial partial ground truth data contains do-not-care regions.

3. The computerized active machine learning method of claim 1, wherein the deep model-1 and the deep model-2 are encoder-decoder networks.

4. The computerized active machine learning method of claim 1, wherein the fast deep semantic segmentation learning-1 minimizes a do-not-care robust loss function at an output layer by iteratively adjusting parameters at each layer of the deep model-1.

5. The computerized active machine learning method of claim 4, wherein the parameters are adjusted by a back propagation method.

6. The computerized active machine learning method of claim 1, wherein the fast deep semantic segmentation learning-2 performs a transfer learning using parameters from the deep model-1.

7. The computerized active machine learning method of claim 1, wherein the fast deep semantic segmentation learning-2 minimizes a do-not-care robust loss function at an output layer by iteratively adjusting parameters at each layer of the deep model-2.

8. The computerized active machine learning method of claim 7, wherein the parameters are adjusted by a back propagation method.

* * * * *